United States Patent [19]

Kato et al.

[11] Patent Number: 4,837,286

[45] Date of Patent: * Jun. 6, 1989

[54] METHOD FOR THE PRODUCTION OF POLYMETHACRYLATES

[75] Inventors: Yasuyuki Kato; Masahiro Yuyama; Masahiko Moritani, all of Niihama; Yukio Yasunori, Toyonaka, all of Japan

[73] Assignee: Sumitomo Chemical Company, Limited, Osaka, Japan

[*] Notice: The portion of the term of this patent subsequent to Jan. 5, 2005 has been disclaimed.

[21] Appl. No.: 901,363

[22] Filed: Aug. 28, 1986

[30] Foreign Application Priority Data

Aug. 30, 1985 [JP] Japan ................................. 60-192791

[51] Int. Cl.$^4$ ................................................. C08F 2/00
[52] U.S. Cl. ..................................................... 526/217
[58] Field of Search .......................................... 526/217

[56] References Cited

U.S. PATENT DOCUMENTS

| | | | |
|---|---|---|---|
| 2,946,770 | 7/1960 | Bader et al. | 526/91 |
| 3,061,598 | 10/1962 | Cornell | 526/217 |
| 3,234,194 | 2/1966 | Slocum | 526/217 |
| 3,487,062 | 12/1969 | Bodycot | 526/217 |
| 3,565,822 | 2/1971 | Bodycot | 502/160 |
| 4,130,704 | 12/1978 | Shimizu | 526/217 |
| 4,174,341 | 11/1979 | Nakano et al. | 524/101 |
| 4,259,462 | 3/1981 | Nakano et al. | 525/263 |
| 4,467,079 | 8/1984 | Hechenberger et al. | 526/217 |
| 4,717,756 | 1/1988 | Kato | 526/147 |

*Primary Examiner*—Joseph L. Schofer
*Assistant Examiner*—Peter D. Mulcahy
*Attorney, Agent, or Firm*—Birch, Stewart, Kolasch & Birch

[57] ABSTRACT

Improved method for the production of polymethacrylates by a rapid polymerization, which comprises polymerizing an unsaturated monomer selected from a methacrylate and a monomer mixture comprising predominantly a methacrylate which may partially contain a polymer of the monomer (i.e. a syrup of the monomer or monomer mixture) in the presence of a radical polymerization initiator, a reducing compound containing sulfur in the molecule thereof, a copper-containing compound and a specific tertiary amine hydrohalogenate or a quaternary ammonium halide. Said polymethacrylates can give molded products having excellent mold release characteristics and are useful particularly for the production of optical parts such as conventional lenses, Fresnel's lens, optical recording disc media, prisms, mirrors, etc.

5 Claims, No Drawings

METHOD FOR THE PRODUCTION OF POLYMETHACRYLATES

This invention relates to an improved method for the production of polymethacrylates. More particularly, it relates to a method for the production of polymethacrylates which can give a molded product having excellent mold release characteristics when polymerized and molded in a mold, which comprises rapidly polymerizing an unsaturated monomer selected from a methacrylate or a monomer mixture comprising predominantly a methacrylate which may partly contain a polymer of the monomer in the presence of a specific polymerization initiator and polymerization accelerator.

PRIOR ART

It is disclosed in West German Patent Publication No. 1,146,254 that an unsaturated monomer such as methyl methacrylate is comparatively rapidly polymerized in the presence of an alkylacyl peroxide, a compound containing sulfur in the molecule, a halogen-containing compound (e.g. tertiary amine hydrochloride, etc.) and optionally a heavy metal-containing compound at room temperature.

According to the polymerization method by the above West German patent publication, the polymerization activity is comparatively high, but when the polymerization and molding are carried out within a mold, the resulting molded product of the polymer has low mold release characteristics and hence the productivity is low.

SUMMARY OF THE INVENTION

The present inventors have studied as to an improved method for the production of polymethacrylates which can give a molded product having excellent mold release characteristics when polymerized and molded in a mold and have found that the desired polymethacrylates can be prepared by polymerizing an unsaturated monomer selected from a methacrylate or a monomer mixture comprising predominantly a methacrylate which may partially contain a polymer of the monomer, in the presence of specific polymerization initiator and polymerization accelerator.

An object of the invention is to provide an improved method for the production of polymethacrylates having excellent moldability. Another object of the invention is to provide a rapid polymerization method for production of the polymethacrylates having the desired properties. These and other objects and advantages of the invention will be apparent to skilled persons from the following description.

DETAILED DESCRIPTION OF THE INVENTION

The present invention provides a method for the production of polymethacrylates which comprises polymerizing 100 parts by weight of an unsaturated monomer selected from a methacrylate and a monomer mixture comprising predominantly a methacrylate which may partially contain a polymer of the monomer in the presence of 0.1 to 5 parts by weight of a radical polymerization initiator, 0.1 to 5 parts by weight of a reducing compound containing sulfur in the molecule thereof, 0.005 to 10 ppm (in copper weight based on the weight of the starting unsaturated monomer) of a coppercontaining compound, and 0.005 to 1 part by weight of a tertiary amine hydrohalogenate of the formula [I]:

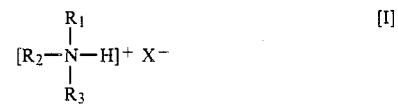

wherein X is a halogen atom, $R_1$, $R_2$ and $R_3$ are the same or different and are each an alkyl having 1 to 16 carbon atoms, and the total carbon numbers of these $R_1$, $R_2$ and $R_3$ (represented by $C_1$, $C_2$ and $C_3$, respectively) are in the range of the formula: $10 \leq (C_1 + C_2 + C_3) \leq 42$, or a quaternary ammonium halide of the formula [II]:

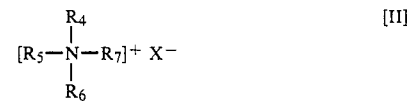

wherein X is a halogen atom, $R_4$, $R_5$, $R_6$ and $R_7$ are the same or different and are each an alkyl having 1 to 16 carbon atoms, and the total carbon mumbers of $R_4$, $R_5$, $R_6$ and $R_7$ (represented by $C_4$, $C_5$, $C_6$ and $C_7$, respectively) are in the range of the formula: $11 \leq (C_4 + C_5 + C_6 + C_7) \leq 43$.

The methacrylates used in this invention include esters of methacrylic acid with monohydric or dihydric or more polyhydric alcohols having 1 to 25 carbon atoms or phenols. Suitable examples of the alcohols and phenols are methanol, ethanol, isopropanol, t-butanol, sec-butanol, phenol, cyclohexanol, 4-methylcyclohexanol, 1-cyclohexylethanol, 1-adamantanol, 2-adamantanol, 3-methyl-1-adamantanol, 3,5-dimethyl-1-adamantanol, 3-ethyladamantanol, 3-methyl-5-ethyl-1-adamantanol, 3,5,8-triethyl-1-adamantanol, 3,5-dimethyl-8-ethyl-1-adamantanol, octahydro-4,7-menthanoinden-5-ol, octahydro-4,7-menthanoinden-1-ylmethanol, p-menthanol-8, p-menthanol-2,3-dihydroxy-2,6,6-trimethylbicyclo[3.1.1]heptane, 3,7,7-trimethyl-4-hydroxy-bicyclo[4.1.0]heptane, borneol, isoborneol, 2-methylcamphanol, phenethyl alcohol, l-menthanol, 2,2,5-trimethylcyclohexanol, ethylene glycol, diethylene glycol, tetraethylene glycol, nonaethylene glycol, tetradecaethylene glycol, bisphenol A, trimethylolpropane, pentaerythritol, and the like.

The methacrylates may be used alone, but other copolymerizable unsaturated monomers may optionally be used together in order to improve the polymerization activity in the polymerization step or improve the properties of the polymer. Suitable examples of the copolymerizable unsaturated monomer are, for example, acrylates, such as methyl acrylate, ethyl acrylate, butyl acrylate, propyl acrylate, phenyl acrylate, cyclohexyl acrylate, etc.; aromatic vinyl compounds, such as styrene, p-methylstyrene, a-methylstyrene, etc.; acrylic acid; methacrylic acid; malic anhydride; acrylonitrile; and the like. These copolymerizable unsaturated monomers may be used in an amount of not more than 50 parts by weight, preferably not more than 30 parts by weight, to 100 parts by weight of the methacrylate. When the copolymerizable monomer is used in an amount of over the above range, the original properties of the polymethacrylate, such as gloss, weatherability, hardness, etc. are undesirably deteriorated.

The methacrylate or mixture thereof with other copolymerizable unsaturated monomers may be used in the form of a pure monomer, but preferably it is used in the form of so-called syrup of the monomer which contain partially a polymer of the monomer in order to improve the polymerization activity or in view of easy handling thereof. The syrup has a polymer content of 3 to 40% by weight. When the polymer content is over 40% by weight, the syrup has unfavorably, too high a viscosity and hence is hardly handled. The syrup can be prepared by known methods, for example, by polymerizing partially the monomer in the presence of a polymerization initiator and terminating the polymerization reaction at a suitable conversion degree, or by dissolving the prescribed amount of polymer in the monomer.

The radical polymerization initiator used in this invention is preferably peroxides, particularly peroxyesters and hydroperoxides, in view of high polymerization activity. Suitable examples of the peroxyesters are, for example, t-butyl peroxy-3,5,5-trimethylhexanoate, t-butyl peroxyacetate, t-butyl peroxybenzoate, and the like. Suitable examples of the hydroperoxides are t-butyl hydroperoxide, cumene hydroperoxide, diisopropylbenzene hydroperoxide, p-menthane hydroperoxide, 2,5-dimethylhexane-2,5-dihydroperoxide, 1,1,3,3,-tetramethylbutyl hydroperoxide, and the like. The initiator is used in an amount of 0.1 to 5 parts by weight to 100 parts by weight of the unsaturated monomer or a syrup thereof. When the amount of the initiator is less than 0.1 part by weight, the polymerization does not sufficiently proceed. On the other hand, when the amount of the initiator is over 5 parts by weight, it is difficult to control the polymerization reaction, and hence, the resulting polymer shows unfavorably lower weatherability and heat resistance.

The reducing compound containing sulfur in the molecule thereof used in this invention is a compound which form a Redox system with the radical polymerization initiator, and includes divalent or tetravelent sulfur compounds selected from sulfinic acid esters, thioureas and mercaptans. Suitable examples of the sulfur-containing reducing compound are methyl p-toluenesulfinate, ethyl p-toluenesulfinate, tetramethylthiourea, dibutylthiourea, laurylmercaptan, t-dodecylmercaptan, octylmercaptan, butylmercaptan, 2-ethylhexyl thioglycolate, pentaerythritol tetrathioglycolate, glycol dimercaptoacetate, 2-mercaptoethanol and esters thereof, $\beta$-mercaptopropionic acid and esters thereof, and the like. The sulfur-containing reducing compound is used in an amount of 0.1 to 5 parts by weight to 100 parts by weight of the unsaturated monomer or a syrup thereof. When the amount of the sulfur-containing reducing compound is less than 0.1 part by weight, the polymerization reaction proceeds at a slower rate, and on the other hand, when it is more than 5 parts by weight, the resulting polymer is unfavorably colored and shows lower mechanical properties.

The copper-containing compound used in this invention is a component as a catalyst for decomposing the polymerization initiator, and includes copper salts of organic acids and copper-containing complexes which are soluble in the monomers such as methacrylate, for example, copper naphthenate, copper acetylacetonate, and the like. These copper-containing compounds are used in an amount of 0.005 to 10 ppm (calculated in copper weight), preferably 0.1 to 5 ppm, based on the weight of the unsaturated monomer or syrup thereof. When the amount of the compound is less than 0.005 ppm, the polymerization reaction proceeds at a slower rate and the polymerization time is not fixed. On the other hand, when the amount of the compound is over 10 ppm, the polymerization initiator is unfavorably deactivated and hence the polymerization reaction is inhibited.

The tertiary amine hydrohalogenate of the formula [I] or quaternary ammonium halide of the formula [II] used in this invention is effective for accelerating stably the polymerization reaction and are also effective for releasing the molded product from the mold. Suitable examples thereof are, for example, hydrochloride or hydrobromide of a tertiary amine such as tributylamine, triamylamine, trihexylamine, trioctylamine, tricyclohexylamine, trilaurylamine, tripalmitylamine, trimyristylamine, tridecylamine, dimethyloctylamine, dimethyllaurylamine, dimethyldecylamine, dimethylmyristylamine, etc.; quaternary ammonium halides, such as trioctylmethylammonium chloride, trideclymethylammonium chloride, trilaurylmethylammonium chloride, trimyristylmethylammonium chloride, and the like. In these compounds, the alkyl group bound to the nitrogen atom thereof has a carbon atom of 1 to 16, and the total number of carbons are in the range of 10 to 42 in the case of the tertiary amine salts and 11 to 43 in the case of the quaternary ammonium salts. When the total carbon numbers are less than the above ranges, the compounds have less solubility in the unsaturated monomer such as methacrylates and the molded products of the polymer show lower mold release characteristics. On the other hand, when the total carbon number are more than the above limits, the compounds have less solubility in the unsaturated monomer such as methacrylates and the polymer shows unfavorably less heat resistance. When at least one of the alkyl groups has a carbon atom of 5 or more, the molded product of the resulting polymer has particularly excellent mold release characteristics. On the other hand, when at least one of the alkyl groups has a carbon atom of more than 17, the compound has unfavorably lower solubility in the unsaturated monomer such as methacrylates. These compounds are used in an amount of 0.005 to 1 part by weight, preferably 0.01 to 0.5 part by weight, to 100 parts by weight of the unsaturated monomer or syrup thereof. When the amount of the above compounds is less than 0.005 part by weight or more than 1 part by weight, the polymerization reaction proceeds unfavorably at the slower rate.

The polymerization reaction of this invention is carried out by a bulk polymerization method where a mold is used. A liquid composition is prepared by dissolving a radical polymerization initiator, a sulfur-containing reducing compound, a copper-containing compound and the specific tertiary amine hydrohalogenate or quaternary ammonium halide in the monomer such as an methacrylate or a syrup thereof, and the liquid composition thus prepared is poured into a mold, followed by subjecting to the polymerization reaction and molding. In the polymerization within a mold, each components may individually be mixed and poured into the mold, but owing to the high polymerization reactivity, it is sometimes very difficult to mix them uniformly. Accordingly, in the preferred embodiment, the polymerization initiator and the reducing compound and copper-containing compound are separately dissolved in a part of the monomer or syrup thereof, and they are mixed in each prescribed amount immediately before subjecting to the polymerization reaction.

The method of this invention may be carried out at room temperature, but is preferably carried out at an elevated temperature such as 50° C. or higher in order to accelerate the polymerization. In such a case, the monomer, polymerization initiator and other ingredients are mixed and poured into the mold and then the temperature in the mold is raised to 50° C. or higher, or alternatively, the temperature in the mold is raised to 50° C. or higher, and then the monomer, polymerization initiator and other ingredients are mixed and poured into the mold, followed by subjecting to the polymerization.

Because the molded product of the polymer of this invention has excellent mold release characteristics, the product may be released from the mold by cooling it after the polymerization reaction, but it may be released from the mold without cooling thereof.

The mold used in this invention is preferably a metallic mold in view of the strength, easy cooling, and the like.

The method of this invention can be applied to the production of various formed products of polymethacrylate. That is, by varying the shape of the mold which is used in the polymerization, there can be obtained various shaped products.

This method is particularly suitable for the production of optical parts because the polymer thus prepared has extremely less internal strain. Such optical parts include conventional lenses, Fresnel's lens, optical recording disc media, prisms, mirrors, and the like. In this method, the face of the mold can precisely be transferred, and hence, it is particularly suitable for the production of Fresnel's lens which requires a precise shape. Moreover, this method can easily give large scale shaped products, and hence, is also suitable for the production of automobile parts such as a front window, sun roof, side window, rear window, etc., and further, water tank pannel, bathtub, and the like.

According to this invention, there can be produced the desired polymethacrylates having less coloration and excellent weatherability in a very short period of time. The starting monomer and other ingredients are added to a mold and thereby subjected to polymerization and molding, in which the molded product can easily be released from the mold.

This invention is illustrated by the following Examples but should not be construed to be limited thereto.

EXAMPLES 1 TO 5 AND REFERENCE EXAMPLES 1 TO 2

Preparation of starting syrup of methyl methacrylate

A 10 liter stainless sealed vessel is charged with methyl methacrylate (4 kg) and polymethyl methacrylate (SUMIPEX® BMH, manufactured by Sumitomo Chemical Co., Ltd., 1 kg), and the mixture is dissolved at 60° C. for 5 hours to give the desired starting syrup having a polymer content of 20% by weight and a viscosity of 1 poise.

Polymerization and molding

In the starting syrup (100 g) are dissolved t-butyl peroxybenzoate (1 g), glycol dimercaptoacetate (0.7 g), a 1% solution (0.04 g) of copper naphthenate (Cu content 10%) in methyl methacrylate and an amine hydrochloride (0.09 g) as shown in Table 1. When the amine hydrochloride is not dissolved in the starting syrup of methyl methacrylate, it is used in a 8% solution in diethylene glycol.

The resulting solution is poured within the mold (150×150×3 mm, made of metal, the inner surface being coated with SUS), and then subjected to polymerization by dipping into a water bath of 85° C. After 5 to 8 minutes from initiation of the reaction, the temperature raises to the peak due to the reaction heat, and then, the polymerization reaction is almost completed. There is measured the temperature, at which the product can be released from the mold immediately after the polymerization reaction. The results are shown in Table 1.

TABLE 1

| Ex No. | Amine hydrochloride | Mold release* characteristics |
|---|---|---|
| Ex. 1 | Triamylamine hydrochloride | Δ |
| Ex. 2 | Trioctylamine hydrochloride | ○ |
| Ex. 3 | Dimethyloctylamine hydrochloride | ○ |
| Ex. 4 | Dimethylmyristylamine hydrochloride | ○ |
| Ex. 5 | Dimethyldecylamine hydrochloride | ○ |
| Ref. Ex. 1 | Dibutylamine hydrochloride | x |
| Ref. Ex. 2 | Phenethyldibutylamine hydrochloride | x |

*Mold release characteristics:
○: Releasable at 60° C. or higher
Δ: Releasable at from 40° C. to 60° C.
x: Impossible to release at a 40° C. or higher.

EXAMPLE 6

In the same starting syrup (100 g) as used in Example 1 are dissolved t-butyl peroxybenzoate (1 g), glycol dimercaptoacetate (0.7 g), a 1% solution (0.04 g) of copper naphthenate (Cu content 10%) in methyl methacrylate and trioctylmethylammonium chloride (0.1 g), and the resulting solution is poured into the mold (150×150×3 mm) as used in Example 1, and then subjected to polymerization by dipping into a water bath of 85° C. After 8 minutes from initiation of the reaction, the temperature raises to the peak due to the reaction heat, and then, the polymerization reaction is almost completed. After the polymerization, the molded product can be released from the mold even at 80° C. Thus, the molded product shows excellent mold release characteristics.

What is claimed is:

1. A method for the production of polymethacrylates by bulk polymerization in a mold, which comprises polymerizing 100 parts by weight of an unsaturated monomer selected from a methacrylate and a monomer mixture comprising predominantly a methacrylate which may partially contain a polymer of the monomer in the presence of 0.1 to 5 parts by weight of a radical polymerization initiator, 0.1 to 5 parts by weight of a reducing compound containing sulfur, 0.005 to 10 ppm of a copper-containing compound wherein the weight of the copper is based on the weight of said unsaturated monomer, and 0.005 to 1 part by weight of a tertiary amine hydrohalogenate of the formula:

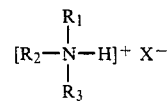

wherein X is a halogen atom, $R_1$, $R_2$ and $R_3$ are the same or different and are each an alkyl having 1 to 16 carbon atoms, and the total carbon numbers of said $R_1$, $R_2$ and $R_3$ are represented by $C_1$, $C_2$ and $C_3$, respectively and are in the range of the formula: $10 \leq (C_1+C_2+C_3) \leq 42$, or a quaternary ammonium halide of the formula:

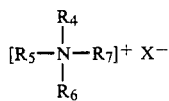

wherein X is a halogen atom, $R_4$, $R_5$, $R_6$ and $R_7$ are the same or different and are each an alkyl having 1 to 16 carbon atoms, and the total carbon numbers of said $R_4$, $R_5$, $R_6$ and $R_7$ are represented by $C_4$, $C_5$, $C_6$ and $C_7$, respectively and are in the range of the formula: $11 \leq (C_4+C_5+C_6+C_7) \leq 43$.

2. A method according to claim 1 wherein the unsaturated monomer is a syrup of an unsaturated monomer selected from a methacrylate and a monomer mixture comprising predominantly a methacrylate.

3. A method according to claim 1, wherein the methacrylate is an ester of methacrylic acid with a monohydric, di- polyhydric alcohol having 1 to 25 carbon atoms or phenol.

4. A method according to claim 1, wherein the radical polymerization initiator is a member selected from the group consisting of peroxyesters and hydroperoxides.

5. A method according to claim 1, wherein the sulfur-containing reducing compound is a member selected from the group consisting of sulfinic acid esters, thioureas and mercaptans.

* * * * *